United States Patent
McGuire et al.

(10) Patent No.: US 10,427,118 B2
(45) Date of Patent: Oct. 1, 2019

(54) ULTRASONIC NUTRIENT MIXING REACTOR

(71) Applicant: Ecosphere Technologies, Inc., Stuart, FL (US)

(72) Inventors: Dennis McGuire, Stuart, FL (US); Naresh N. Mahamuni, Palm City, FL (US)

(73) Assignee: Brisben Water Solutions LLC, Jupiter Island, FL (US)

( * ) Notice: Subject to any disclaimer, the term of this patent is extended or adjusted under 35 U.S.C. 154(b) by 289 days.

(21) Appl. No.: 15/602,976

(22) Filed: May 23, 2017

(65) Prior Publication Data

US 2017/0252712 A1   Sep. 7, 2017

Related U.S. Application Data

(63) Continuation-in-part of application No. 14/950,811, filed on Nov. 24, 2015, now abandoned.
(Continued)

(51) Int. Cl.
*B01F 11/02* (2006.01)
*C02F 1/36* (2006.01)
(Continued)

(52) U.S. Cl.
CPC .......... *B01F 11/0258* (2013.01); *A01G 9/247* (2013.01); *B01F 3/1242* (2013.01);
(Continued)

(58) Field of Classification Search
CPC .............. B01F 11/0258; B01F 11/0005; B01F 3/1242; B01F 11/02; B01F 11/0291;
(Continued)

(56) References Cited

U.S. PATENT DOCUMENTS 3,351,539 A * 11/1967 Branson .............. B01F 11/0258
                                                        204/157.42
4,292,762 A    10/1981 Fogg et al.
(Continued)

FOREIGN PATENT DOCUMENTS

WO     WO2015171606       11/2015

*Primary Examiner* — Charles Cooley
(74) *Attorney, Agent, or Firm* — McHale & Slavin, P.A.

(57) ABSTRACT

An ultrasonic mixing reactor configured for mixing of plant nutrients for greater absorption using cavitation. The reactor includes a venturi nozzle fluidly connected to a nozzle device having at least one annular shaped plate comprised of a plurality of apertures constructed and arranged to create cavitation. The nozzle device is fluidly coupled to a first ultrasonic reactor having a plurality of variable frequency ultrasonic transducers mounted within the first ultrasonic reactor for generating acoustic cavitation of the bulk mixed plant nutrients. The first ultrasonic transducer is fluidly connected to a second ultrasonic reactor having a plurality of variable frequency ultrasonic transducers mounted within the second ultrasonic reactor for generating acoustic cavitation of the bulk mixed plant nutrients. The second ultrasonic reactor discharge is fluidly coupled to a plate static mixer constructed and arranged to create hydrodynamic mixing.

20 Claims, 9 Drawing Sheets

Related U.S. Application Data (60) Provisional application No. 62/083,747, filed on Nov. 24, 2014.

(51) Int. Cl.
- *B01F 5/10* (2006.01)
- *B01F 3/12* (2006.01)
- *B01J 19/18* (2006.01)
- *B01F 11/00* (2006.01)
- *A01G 9/24* (2006.01)

(52) U.S. Cl.
CPC ............ *B01F 5/10* (2013.01); *B01F 11/0005* (2013.01); *B01J 19/185* (2013.01); *C02F 1/36* (2013.01); *Y02A 40/27* (2018.01)

(58) Field of Classification Search
CPC ...... B01F 15/00324; B01F 5/10; A01G 9/247; C02F 1/36; B01J 19/185; Y02A 40/27
See application file for complete search history.

(56) References Cited

U.S. PATENT DOCUMENTS

| | | |
|---|---|---|
| 5,212,903 A | 5/1993 | Talbott |
| 5,813,168 A | 9/1998 | Clendening |
| 6,318,888 B1 | 11/2001 | Kuesegen et al. |
| 6,978,573 B2 | 12/2005 | Van Der Heijden |
| 7,228,657 B2 | 6/2007 | Brault et al. |
| 7,699,988 B2 | 4/2010 | McGuire et al. |
| 7,699,994 B2 * | 4/2010 | McGuire ................. C02F 1/004 210/748.01 |
| 7,785,470 B2 * | 8/2010 | McGuire .................. C02F 9/00 210/151 |
| 8,206,024 B2 | 6/2012 | Wenzel et al. |
| 8,235,579 B2 | 8/2012 | Hielscher et al. |
| 8,318,027 B2 * | 11/2012 | McGuire ................. C02F 1/004 210/151 |
| 8,591,093 B2 | 11/2013 | Schoenfeld |
| 8,616,759 B2 | 12/2013 | Cool et al. |
| 8,707,617 B2 | 4/2014 | Houweling |
| 8,721,898 B2 | 5/2014 | McGuire et al. |
| 8,783,941 B2 | 7/2014 | Cool et al. |
| 8,858,064 B2 | 10/2014 | McGuire et al. |
| 8,936,392 B2 | 1/2015 | McGuire et al. |
| 9,010,019 B2 | 4/2015 | Mittelmark |
| 2005/0260106 A1 * | 11/2005 | Marhasin ............ B01F 11/0266 422/128 |
| 2008/0159063 A1 * | 7/2008 | Janssen ................. B01F 5/0695 366/118 |
| 2009/0230059 A1 * | 9/2009 | McGuire ................... C02F 9/00 210/638 |
| 2015/0170929 A1 * | 6/2015 | Chiang ............. H01L 21/30625 438/14 |
| 2016/0212948 A1 * | 7/2016 | McGuire ................. A01G 9/247 |
| 2017/0252712 A1 * | 9/2017 | McGuire ................. A01G 9/247 |

* cited by examiner

STATIC MIXER SYSTEM

NOZZLE SYSTEM

ECOJECTOR SYSTEM

ULTRASONIC NUTRIENT MIXING REACTOR

REFERENCE TO RELATED APPLICATIONS

In accordance with 37 C.F.R. 1.76, a claim of priority is included in an Application Data Sheet filed concurrently herewith. Accordingly, the present invention claims priority as a continuation-in-part of U.S. patent application Ser. No. 14/950,811, filed Nov. 24, 2015, entitled "AUTOMATED GREENHOUSE", which claims the benefit of the priority of U.S. Provisional Patent Application No. 62/083,747, filed Nov. 24, 2014, entitled "AUTOMATED GREENHOUSE". The contents of the above referenced applications are incorporated herein by reference.

FIELD OF THE INVENTION

This invention is directed to the field of agriculture and to a mixing reactor system that increases the efficiency of mixing plant nutrients.

BACKGROUND OF THE INVENTION

As the World population continues to grow, so does the need to supply that population with healthy sustainable food. Water, nutrients and air are all mixed with soil to create a nutrient rich environment for crops to grow. Nutrient rich soil is essential to yielding multiple crops. When soil is farmed repeatedly, many times it becomes necessary to add fertilizers to provide the essential nutrients for plants. Nutrient deficiency can severely limit growth and crop yield.

As environmental factors continue to make crop production increasingly more difficult, it is essential to provide a nutrient rich soil. Increasing the efficiency of available resources utilized in farming is the key to increasing crop production. Therefore, what is needed in the field of agriculture is an advanced mixing system that incorporates ultrasonic and mechanical cavitation to increase the mixing efficiency of plant nutrients thereby causing an increase in the amount of nutrients absorbed by the plants.

DESCRIPTION OF THE PRIOR ART

Keusegen, et al., U.S. Pat. No. 6,318,888 discloses an apparatus for introducing vibrations into a vessel having: (a) a vessel capable of receiving a fluid medium; (b) a flexible membrane located at a bottom end of the vessel; (c) an upper pressure chamber located adjacent to an outer surface of the flexible membrane; (d) a lower pressure chamber located below the upper pressure chamber; (e) a linkage member; (f) vibrating means connected to the linkage member; and (g) a rod member rigidly connected to both the linkage member and the flexible membrane for transmitting vibrations into the vessel, the rod member being axially located within the upper and lower pressure chambers.

Wenzel, et al., U.S. Pat. No. 8,206,024 discloses an ultrasonic mixing system having a particulate dispensing system to dispense particulates into a treatment chamber and the treatment chamber in which particulates can be mixed with one or more formulations. Specifically, the treatment chamber has an elongate housing through which a formulation and particulates flow longitudinally from an inlet port to an outlet port thereof. An elongate ultrasonic waveguide assembly extends within the housing and is operable at a predetermined ultrasonic frequency to ultrasonically energize the formulation and particulates within the housing. An elongate ultrasonic horn of the waveguide assembly is disposed at least in part intermediate the inlet and outlet ports, and has a plurality of discrete agitating members in contact with and extending transversely outward from the horn intermediate the inlet and outlet ports in longitudinally spaced relationship with each other. The horn and agitating members are constructed and arranged for dynamic motion of the agitating members relative to the horn at the predetermined frequency and to operate in an ultrasonic cavitation mode of the agitating members corresponding to the predetermined frequency and the formulation and particulates being mixed in the chamber.

Hielscher, et al., U.S. Pat. No. 8,235,579 discloses a method and device for introducing ultrasound into a flowable medium using a sonotrode, wherein the flowable medium is not in direct contact with the sonotrode. The method comprises the following steps: placing a film (8) on the sonotrode (4) in such a way that the contact force by means of which the film (8) is pressed on the sonotrode (4) is always so great that the film (8) follows the lifting motions of the sonotrode (4) in the corresponding frequency and amplitude; applying ultrasound power through the film (8) into the medium (2) and transmitting the wear phenomena onto the film (8).

Schoenfeld, U.S. Pat. No. 8,591,093 discloses a mixing element for a flowable substance, comprising a body enclosing a cavity, wherein the cavity has at least one opening and the cavity and the opening are located relative to the body such that a fluid flow of the flowable substance out of the cavity through the opening transfers a torque to the mixing element. The invention further relates to the use of a tube or hose section as such a mixing element and a mixing device comprising such a mixing element, a container, and a sound source coupled thereto for generating an oscillating pressure.

Cool, et al., U.S. Pat. No. 8,616,759 discloses an ultrasonic treatment system for ultrasonically treating a substance, an elongate ultrasonic horn is positionable within the substance and excitable to vibrate ultrasonically to energize the substance. The horn has a longitudinal axis and an outer surface for contact with the substance. An agitating member of the system is disposed on the ultrasonic horn and is rotatable about the longitudinal axis of the horn during ultrasonic vibration of the horn to agitate the substance.

Cool, et al., U.S. Pat. No. 8,783,941 discloses a method of ultrasonically treating a substance disposed within a container where an ultrasonic horn is positioned within the container with at least a portion of the horn submerged in the substance. The horn is ultrasonically excited to thereby ultrasonically energize the substance. An agitating member is rotated within the substance while the ultrasonic horn is excited to agitate the substance as the substance is ultrasonically energized.

SUMMARY OF THE INVENTION

Disclosed is an ultrasonic plant nutrient mixing reactor. The reactor includes a venturi nozzle fluidly connected to a nozzle device having at least one annular shaped plate comprised of a plurality of apertures constructed and arranged to create cavitation. The nozzle device is fluidly coupled to a first ultrasonic reactor having a plurality of variable frequency ultrasonic transducers mounted within the first ultrasonic reactor for generating acoustic cavitation of the bulk mixed plant nutrients. The first ultrasonic transducer is fluidly connected to a second ultrasonic reactor having a plurality of variable frequency ultrasonic transducers mounted within the second ultrasonic reactor for generating acoustic cavitation of the bulk mixed plant nutrients. The second ultrasonic reactor discharge is fluidly coupled to a plate static mixer constructed and arranged to create hydrodynamic mixing. The reactor is configured for mixing of plant nutrients to condition the mixture in various ways for greater absorption using cavitation.

Accordingly, it is an objective of the instant invention to increase the co-solubility of individual salts in the solution of multiple salts.

It is a further objective of the instant invention to reduce the surface tension of the mixture without using surfactants.

It is yet another objective of the instant invention to create a more homogeneous and uniform liquid fertilizer through reduction of the particle size of suspended particles in liquid fertilizers.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

The Applicant has been awarded patents for unique processes that employ cost-effective on-site cavitation reactors that combines ozone, hydrodynamic cavitation, ultra-sound and electro-precipitation (see U.S. Pat. Nos. 7,699,994; 7,699,988; 7,785,470; 8,318,027; 8,721,898; 8,858,064 and 8,936,392 the contents of which are herein incorporated by reference).

The water treatment system of the instant invention employs ozone, hydrodynamic cavitation, acoustical cavitation, and electrochemical oxidation to oxidize and destroy contaminants. Ozone is added to the condensate 42 in an amount to operate as an oxidizing agent ($E°=+2.07V$) that can react with most species containing multiple bonds (such as $C=C$, $C=N$, $N=N$, etc.) at high rates and also result in significant degree of disinfection. These oxidations are simple and the mechanisms only require contact of ozone with the chemical constituents. Although the thermodynamics for ozone-induced oxidation is favorable due to ozone's high reduction potential, kinetic factors will most often dictate whether ozone will give required degree of treatment in a reasonable time frame. Thus, a combination of ozone with additional techniques gives better contact and mass transfer rates to result in a significant degree of process intensification.

Cavitation as used in this invention is defined as the combined phenomena of the formation, growth and subsequent collapse of micro bubbles or cavities occurring over an extremely small interval of time releasing large magnitudes of energy at the location of transformation. Cavitation herein includes ultrasound cavitation which when combined with the hydrodynamic cavitation is efficient in bringing about a desired chemical/physical change in water. Hydrodynamic cavitation is generated by using an orifice plate with the flowing fluid expanding as pursuant to Bernoulli's equation. At the orifice plate, kinetic energy of the liquid increases at the expense of pressure head sufficient to cause the pressure around the pressure heat to fall below a threshold pressure for cavitation wherein cavities are generated. Subsequently, as the liquid expands reducing the average velocity and the pressure increases resulting in the collapse of the cavities. Hydrodynamic cavitation takes place by the flow of a liquid under controlled conditions through various geometries. The phenomenon consists in the formation of hollow spaces which are filled with a vapor gas mixture in the interior of a fast-flowing liquid or at peripheral regions of a fixed body which is difficult for the fluid to flow around and the result is a local pressure drop caused by the liquid movement. At a particular velocity, the pressure may fall below the vapor pressure of the liquid being pumped, thus causing partial vaporization of the cavitating fluid. With the reduction of pressure there is liberation of the gases which are dissolved in the cavitating liquid. These gas bubbles also oscillate and then give rise to the pressure and temperature pulses. The mixing action is based on many forces originating from the collapsing or implosions of cavitation bubbles. If during the process of movement of the fluid the pressure at some point decreases to a magnitude under which the fluid reaches a boiling point for this pressure, then a great number of vapor filled cavities and bubbles are formed. Insofar as the vapor filled bubbles and cavities move together with the fluid flow, these bubbles move into an elevated pressure zone. Where these bubbles and cavities enter, a zone having increased pressure, vapor condensation takes place within the cavities and bubbles, almost instantaneously, causing the cavities and bubbles to collapse, creating very large pressure impulses. The magnitude of the pressure impulses with the collapsing cavities and bubbles may reach ultra high pressure implosions leading to the formation of shock waves that emanate from the point of each collapsed bubble. The spectacular effects of cavitation are used in combination with the electrolysis and an ultrasonic transducer to cause acoustic cavitation.

Ultrasonic leads to an increase of concentration of microcells and influences favorable change of the pH of the water. The pH changes after the water treatment and so does the electrical potential measured in terms of the ORP. These changes are used to assure nutrients can be better digested by the plants. Typically, these will be uniformly mixed in the water due to the microscale turbulence generated by cavitation and easily taken up during the process. A sonoluminescence effect is observed due to acoustic cavitation as these ultrasonic waves propagate in the water and catch the micro bubbles in the valley of the wave. Sonoluminescence occurs whenever a sound wave of sufficient intensity induces a gaseous cavity within a liquid to quickly collapse. This cavity may take the form of a pre-existing bubble, or may be generated through hydrodynamic and acoustic cavitation. Sonoluminescence can be made to be stable, so that a single bubble will expand and collapse repeatedly in a periodic fashion, emitting a burst of light each time it collapses. The frequencies of resonance depend on the shape and size of the container in which the bubble is contained. The light flashes from the bubbles are extremely short, between 35 and few hundred picoseconds long, with peak intensities of the order of 1-10 mW. The bubbles are very small when they emit light, about 1 micrometer in diameter depending on the ambient fluid, such as water, and the gas content of the bubble. Single bubble sonoluminescence pulses can have very stable periods and positions. In fact, the frequency of light flashes can be more stable than the rated frequency stability of the oscillator making the sound waves driving them. However, the stability analysis of the bubble shows that the bubble itself undergoes significant geometric instabilities, due to, for example, the Bjerknes forces and the Rayleigh-Taylor instabilities. The wavelength of emitted light is very short; the spectrum can reach into the ultraviolet. Light of shorter wavelength has higher energy, and the measured spectrum of emitted light seems to indicate a temperature in the bubble of at least 20,000 Kelvin, up to a possible temperature in excess of one mega Kelvin. The veracity of these estimates is hindered by the fact that water, for example, absorbs nearly all wavelengths below 200 nm. This has led to differing estimates on the temperature in the bubble, since they are extrapolated from the emission spectra taken during collapse, or estimated using a modified Rayleigh-Plesset equation. During bubble collapse, the inertia of the surrounding water causes high speed and high pressure, reaching around 10,000 K in the interior of the bubble, causing ionization of a small fraction of the noble gas present. The amount ionized is small enough for the bubble to remain transparent, allowing volume emission; surface emission would produce more intense light of longer duration, dependent on wavelength, contradicting experimental results. Electrons from ionized atoms interact mainly with neutral atoms causing thermal bremsstrahlung radiation. As the ultrasonic waves hit a low energy trough, the pressure drops, allowing electrons to recombine with atoms, and light emission to cease due to this lack of free electrons. This makes for a 160-picosecond light pulse for argon, as even a small drop in temperature causes a large drop in ionization, due to the large ionization energy relative to the photon energy. The electrochemical production of hydroxyl radicals and their role in electrochemical oxygen transfer reactions depend on the electrode material used. The mechanism of hydroxyl radical's formation depends also on the electrical potential. These radicals are then more or less strongly adsorbed at the surface.

FIGS. 1-8, which are referenced herein with like components numbered consistently throughout, disclose an ultrasonic mixing reactor system 10 for mixing plant nutrients. The ultrasonic mixing reactor 10 is comprised of at least one pump 20 fluidly coupled to a source of fluid bulk mixed plant nutrients. The one pump discharge 20 is fluidly connected to a venturi nozzle device 22.

Figure 2:
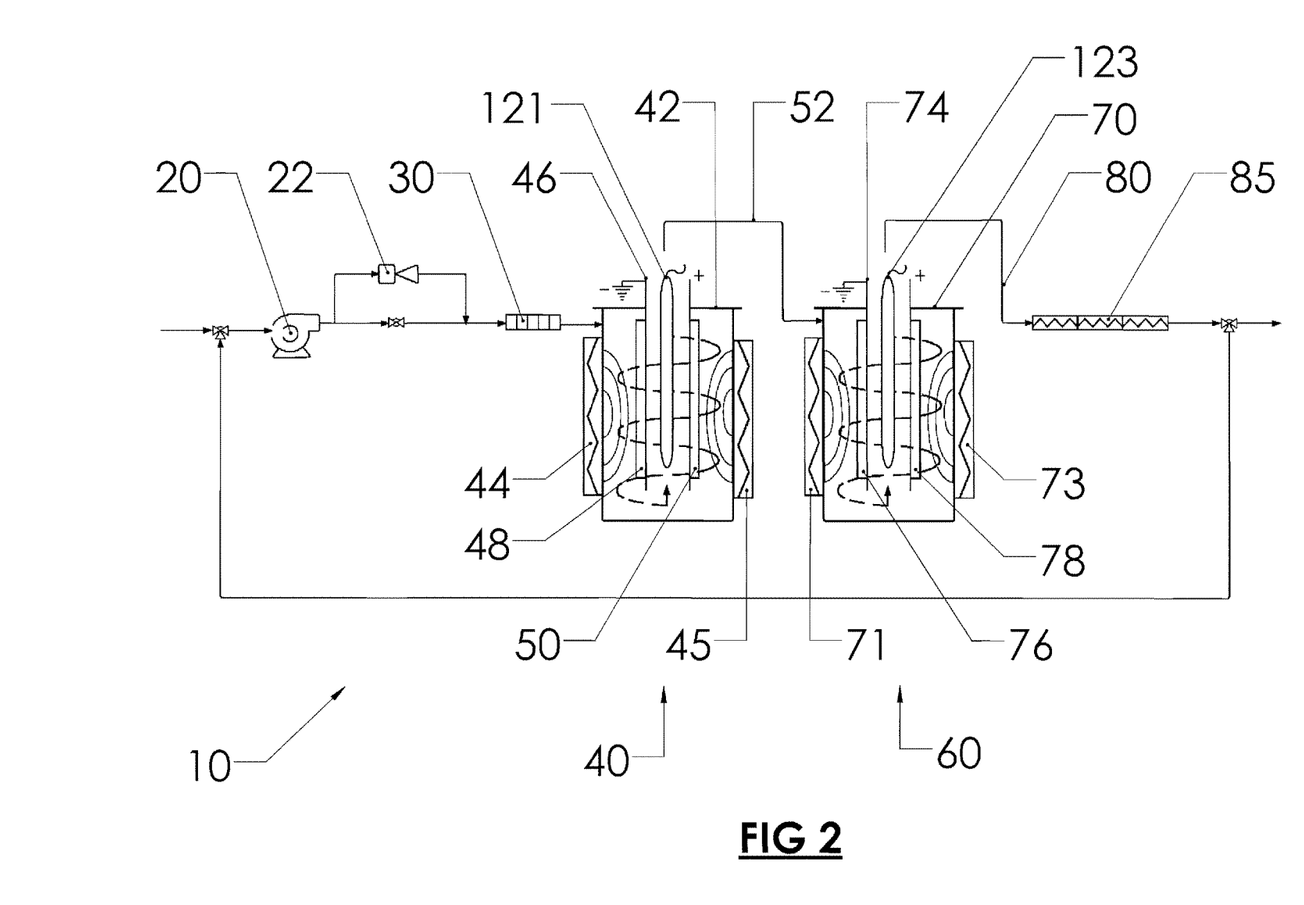
FIG. 2 is a flow diagram of an alternative embodiment in the present invention.
Figure 3:
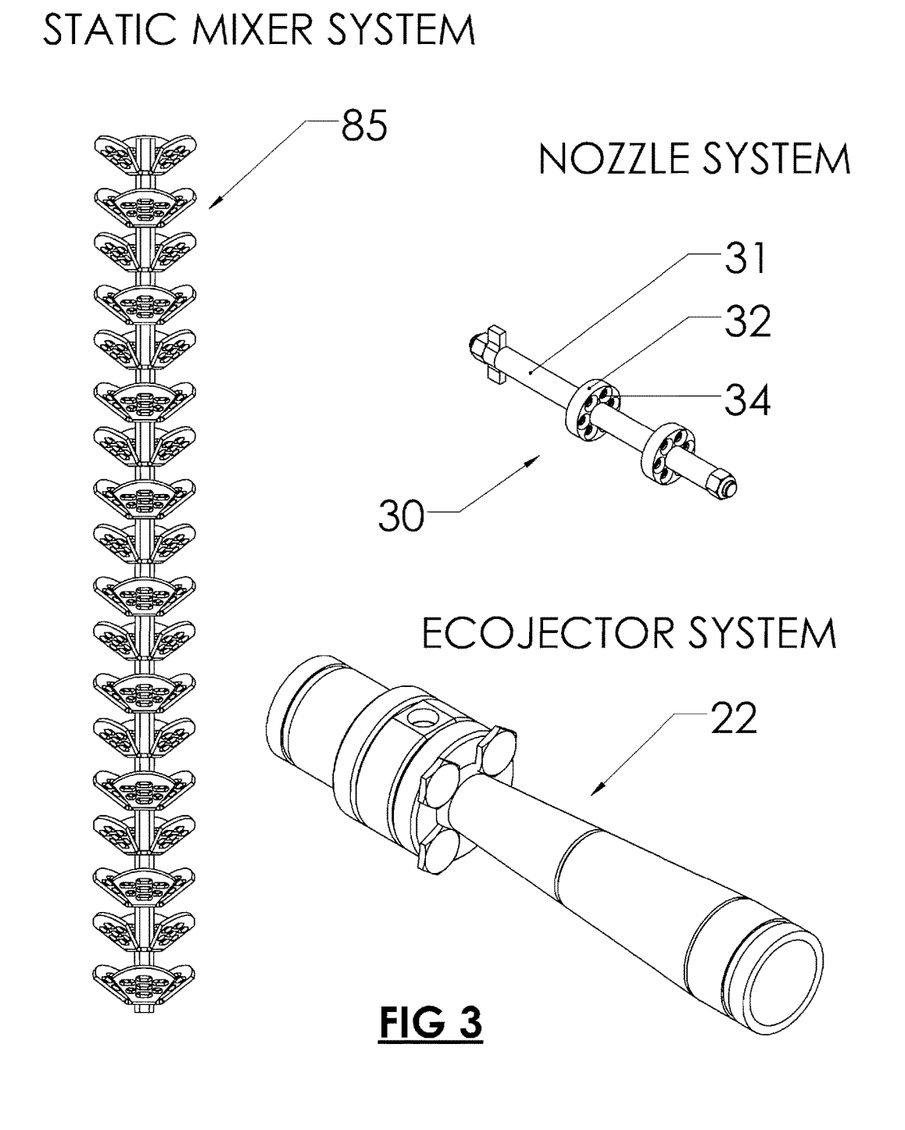
FIG. 3 is a pictorial view of the static mixing components in the mixing reactor.
Figure 4:
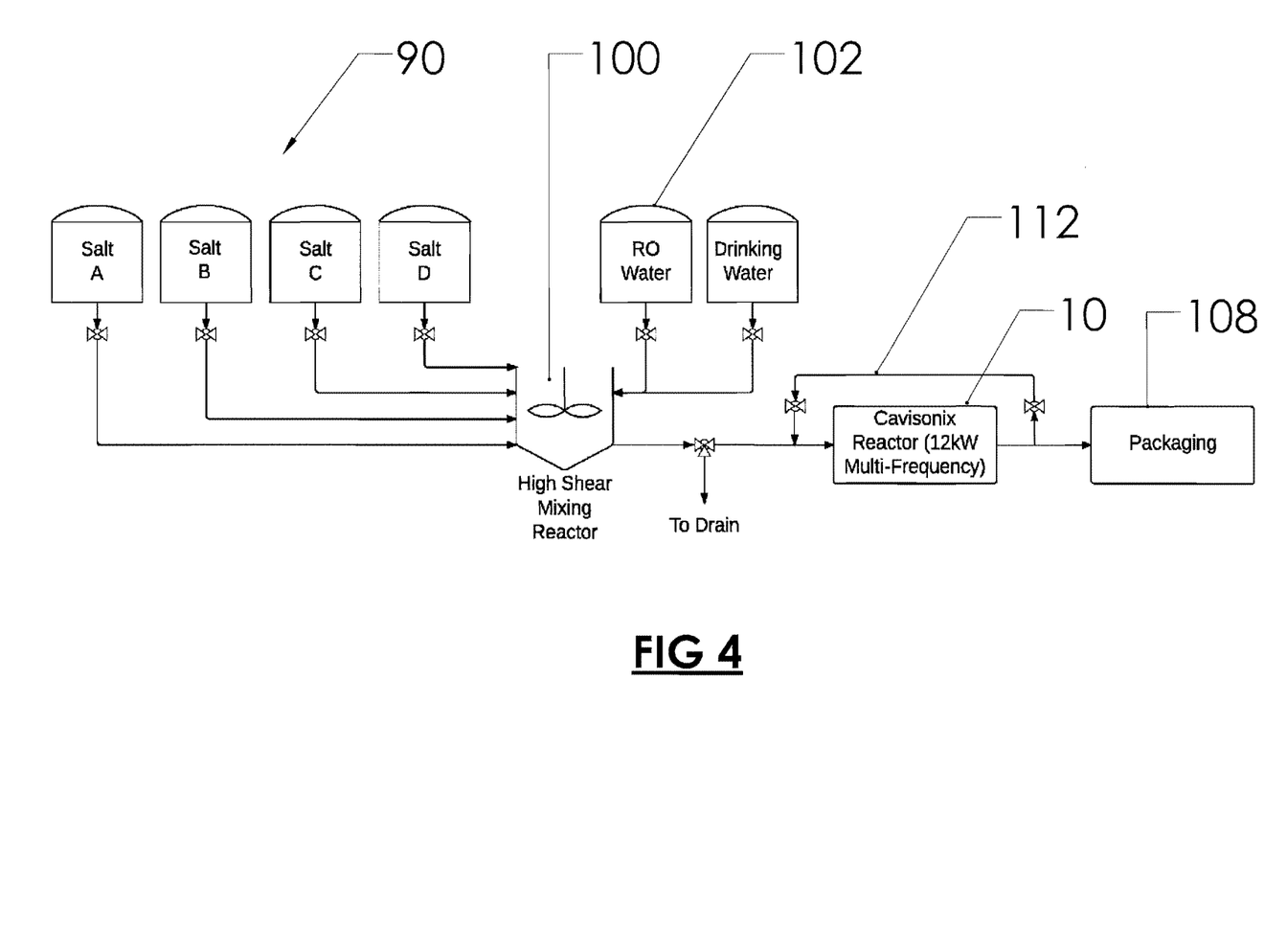
FIG. 4 is a process flow diagram of the mixing system in the present invention.
Figure 5:
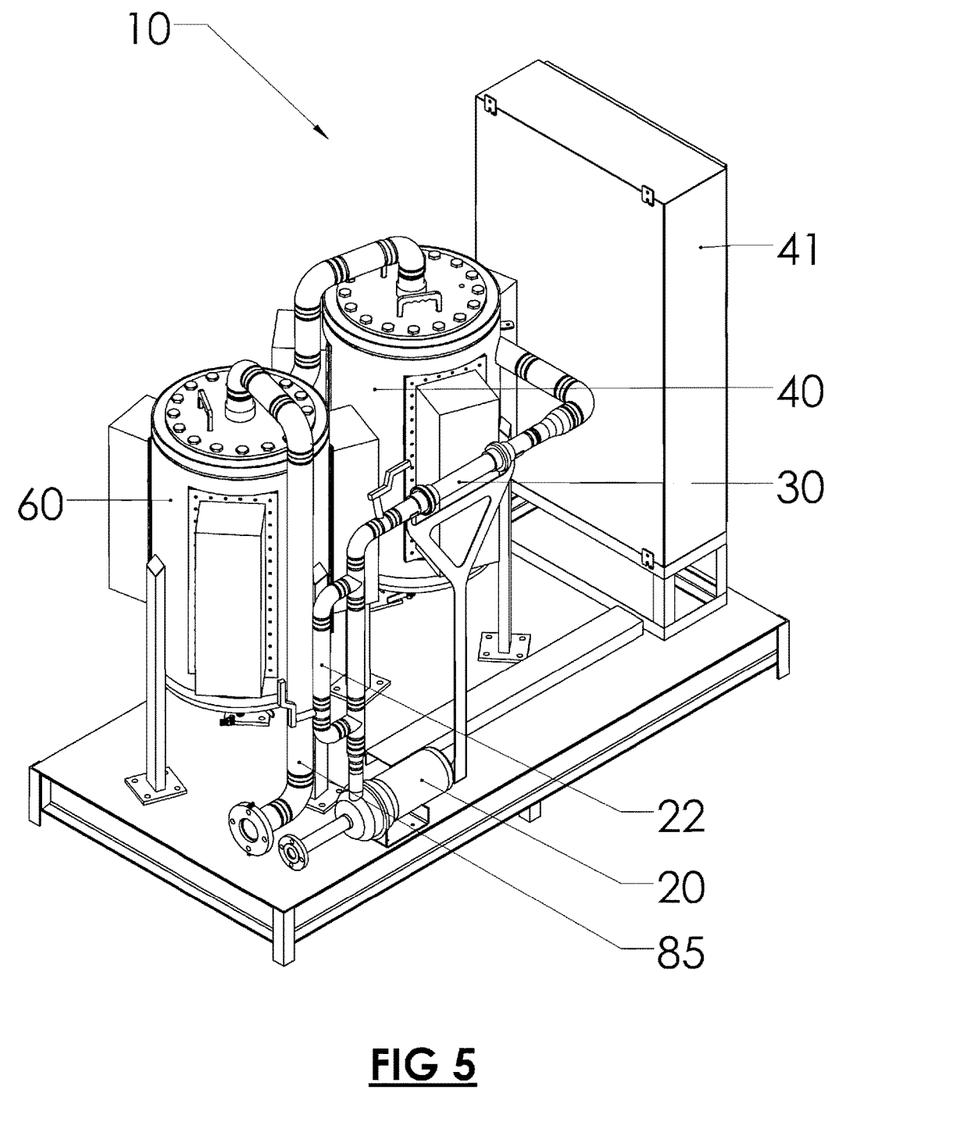
FIG. 5 is a front perspective view of the ultrasonic mixing reactor.
Figure 6:
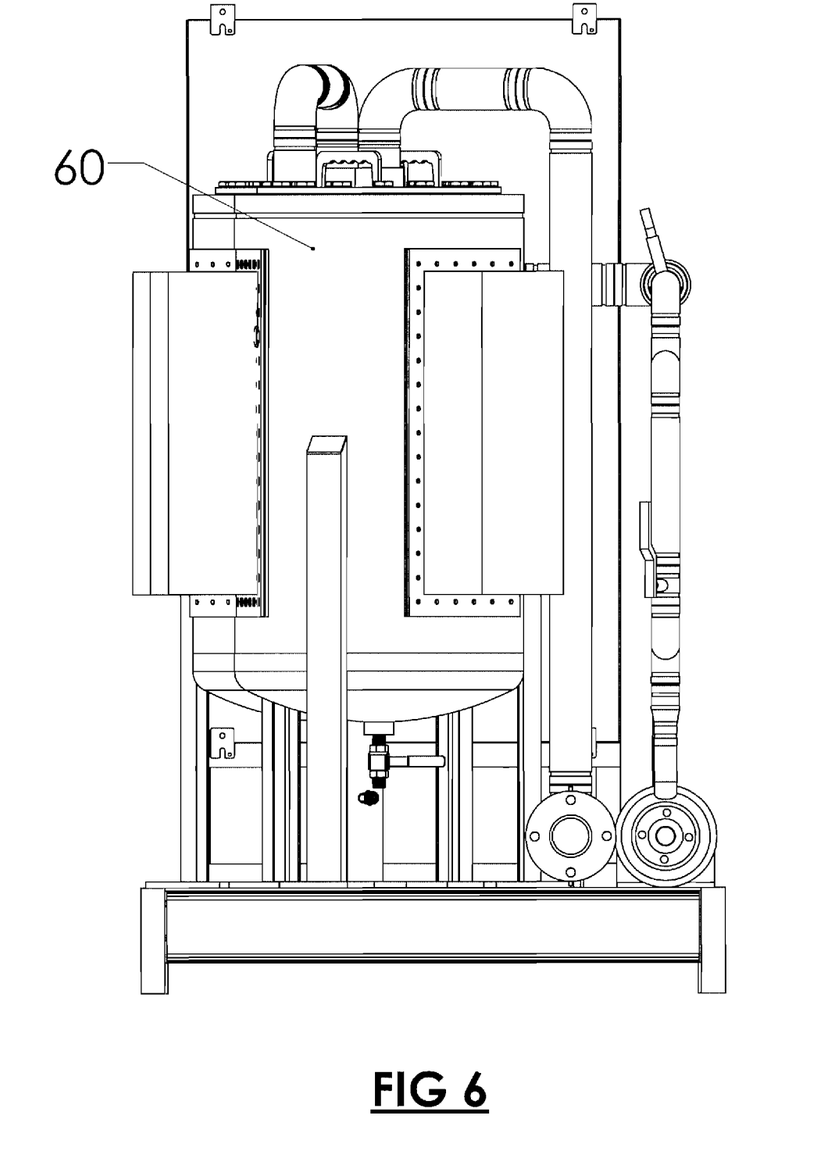
FIG. 6 is a side perspective view of the ultrasonic mixing reactor.
Figure 7:
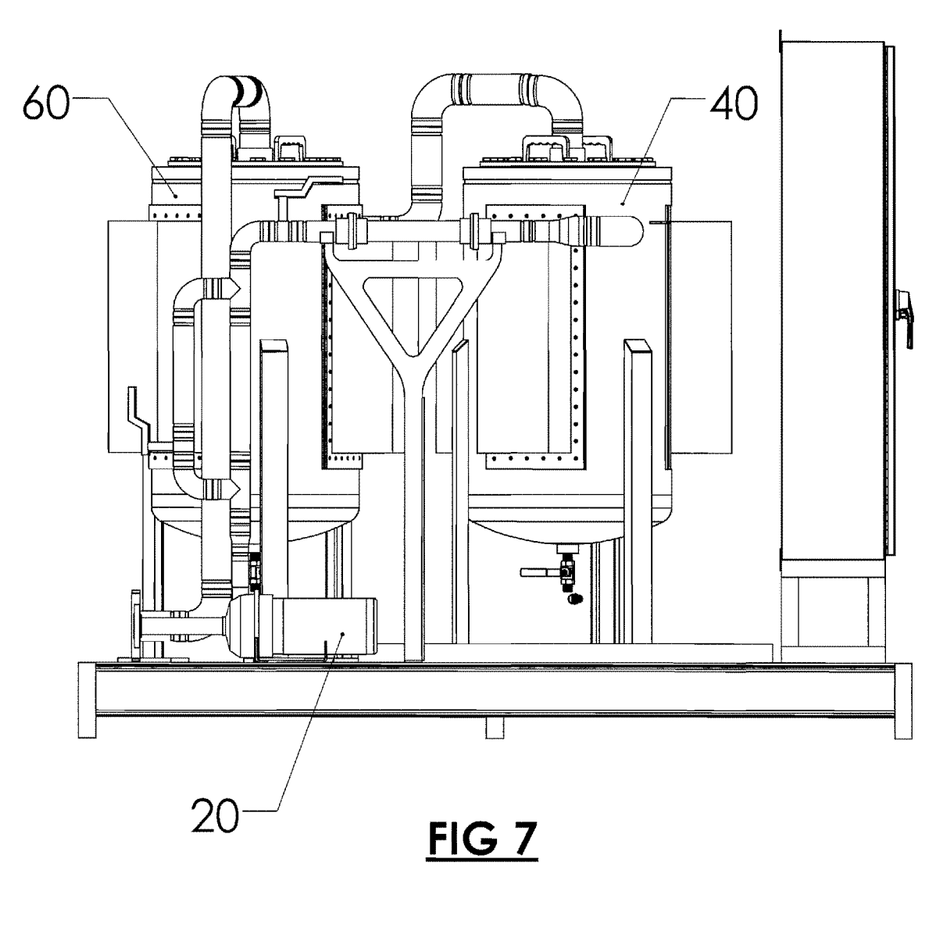
FIG. 7 is a rear perspective view of the ultrasonic mixing reactor.
Figure 8:
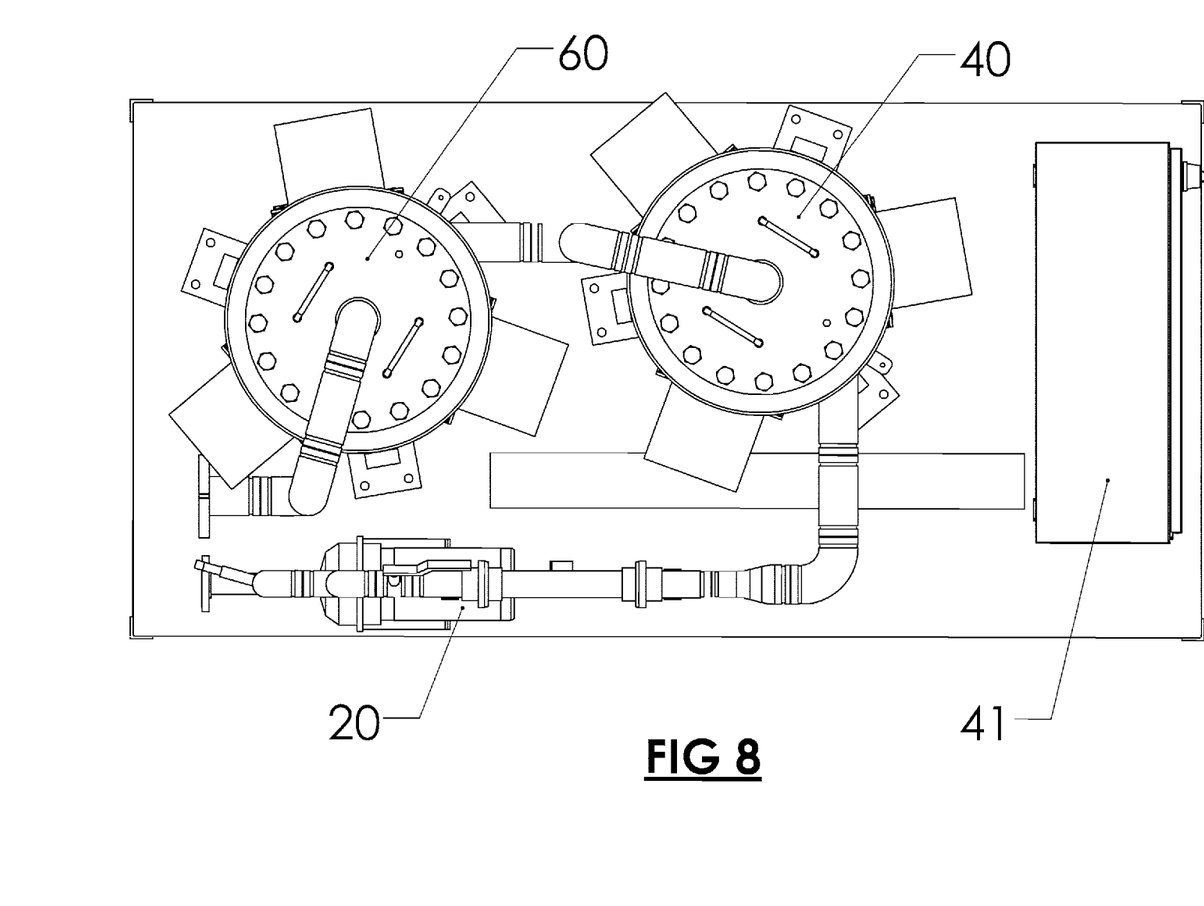
FIG. 8 is a top perspective view of the ultrasonic mixing reactor.
Figure 9:
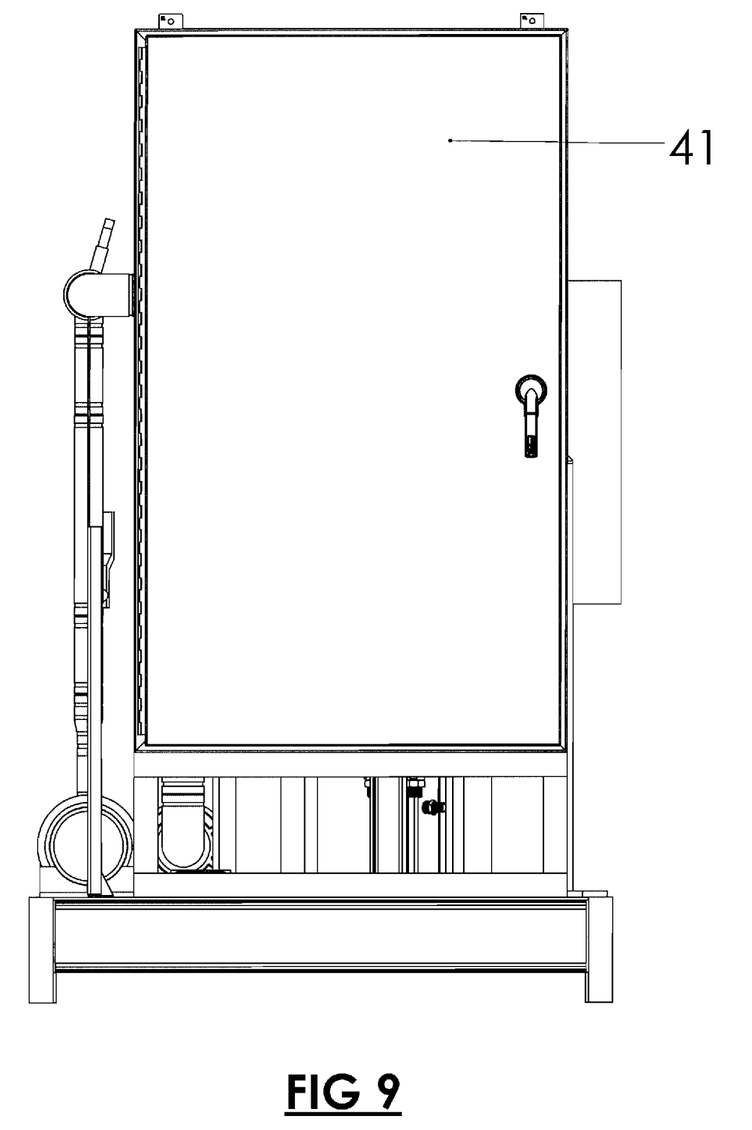
FIG. 9 is a side perspective view of the ultrasonic mixing reactor.

The venturi nozzle 22 discharge is fluidly connected to a nozzle cavitation device 30 constructed and arranged to be coupled to the piping of the system. The nozzle cavitation device 30, as depicted in FIG. 2, has an internal assembly 31 having at least one annular shaped plate 32 comprised of a plurality of apertures 34. In this embodiment, the internal assembly 31 is constructed and arranged to create cavitation of the fluid as it passes through the device.

Figure 1:
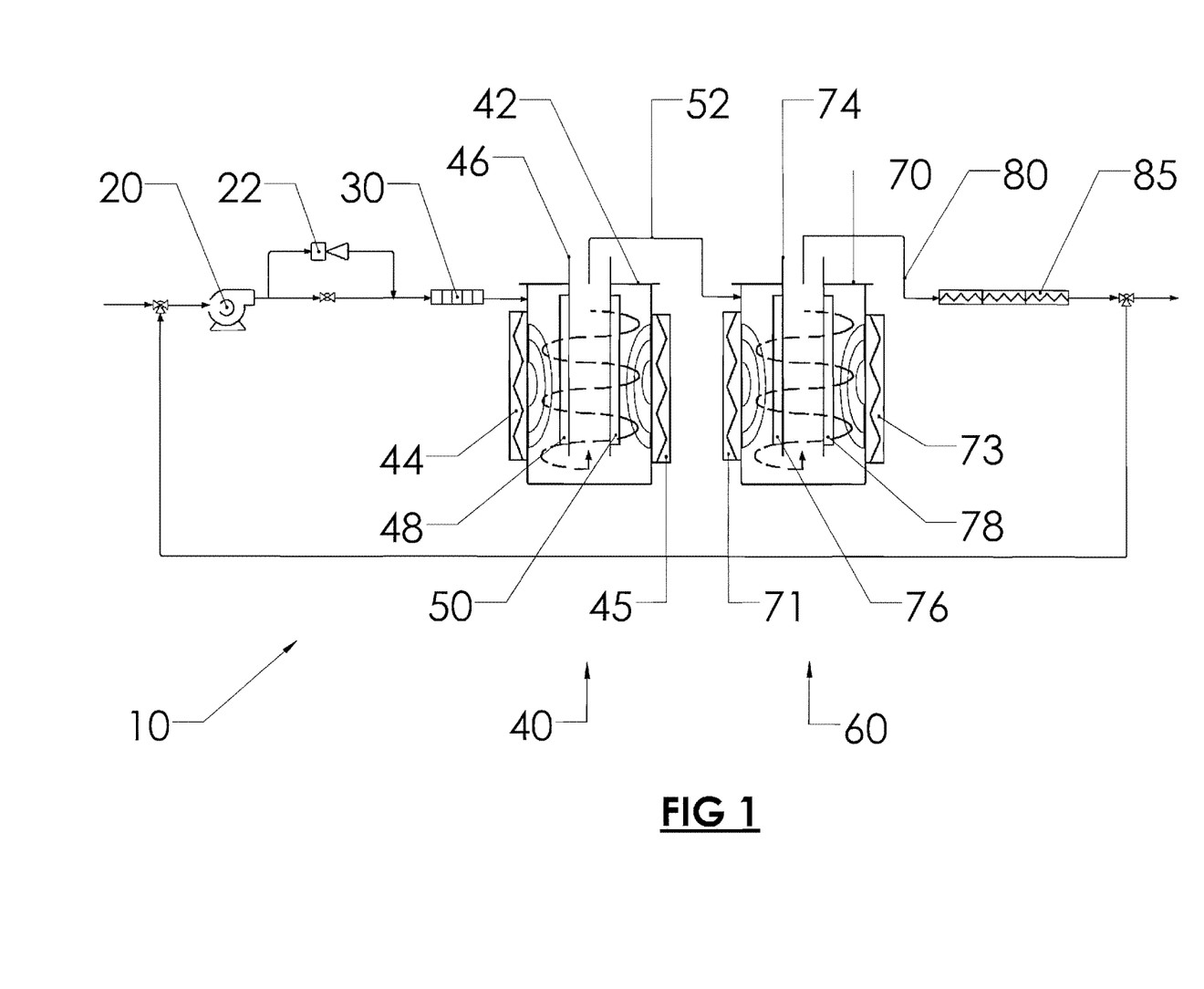
FIG. 1 is a flow diagram of the mixing reactor in the present invention.

The nozzle device 30 discharge is fluidly coupled to a first ultrasonic reactor 40. FIG. 1 illustrates that the first ultrasonic reactor 40 is comprised of a container 42 having a plurality of variable frequency ultrasonic transducers 44,45 mounted within said first ultrasonic reactor for generating acoustic cavitation of the bulk mixed plant nutrients. The container 42 has a tube 46 centrally disposed within the container, however the tube can be mounted in any configuration without deviating from the scope of the invention. The tube 46 is constructed and arranged to create a directional vortex for discharge of the mixed fluid from the first ultrasonic reactor. The container 40 has a plurality of plates 48, 50 mounted at a predetermined distance from the plurality of ultrasonic transducers 44, 45. The plates 48, 50 are constructed and arranged to deflect acoustic waves within the container to facilitate enhanced acoustic mixing of the plant nutrient mixture.

The first ultrasonic reactor discharge 52 is fluidly connected to a second ultrasonic reactor 60 which is comprised of a second container 70. The second container 70 has a plurality of variable frequency ultrasonic transducers 71, 73 mounted within said second ultrasonic reactor 60 for generating acoustic cavitation of the bulk mixed plant nutrients. In the exemplary embodiment of FIG. 1, the second container 70 is has a tube 74 centrally disposed within the second container 70. The tube 74 constructed and arranged to create a directional vortex for discharge of the fluid the second ultrasonic reactor 60. The container 70 has a plurality of plates 76, 78 mounted at a predetermined distance from the plurality of ultrasonic transducers 71, 73. The plurality of plates 76, 78 are constructed and arranged to deflect acoustic waves within the container 70 to facilitate enhanced acoustic mixing of the plant nutrient mixture. The second ultrasonic reactor 70 discharge 80 is fluidly coupled to an advanced plate static mixer 85 constructed and arranged to create hydrodynamic mixing.

FIG. 2 discloses an alternate embodiment where the container 42 has a tube 46 centrally disposed within the container 42 with at least one electrode 121 positioned within the tube 46 constructed and arranged to be in contact with the fluid containing the plant nutrients. The second container 70 has a tube 74 centrally disposed within the second container 70 with at least one electrode 123 positioned within the tube 74 constructed and arranged to be in contact with the fluid containing the plant nutrients. The electrodes 121 and 123 are electrically connected to a power source in order to supply a predetermined amount of electricity to the solution. The purpose of the addition of the electrodes in the reactor is to dissolve the precipitated salts and keep the salts suspended in solution.

FIGS. 4-7 disclose a non-limiting embodiment for mixing plant nutrients, wherein the first ultrasonic reactor 40 and the second ultrasonic reactor 60 are cylindrical. The plurality of ultrasonic transducers 44, 45 that are mounted within the first ultrasonic reactor 40 operate at 16 kHz 6000 Watts. The plurality of ultrasonic transducers 71, 73 mounted within said second ultrasonic reactor operate at 20 kHz 6000 Watts.

After the liquid fertilizer is passed through the nutrient mixing reactor system, the plant nutrient particles size is reduced to less than 20 microns. Independent testing revealed that treatment resulted in smaller particle sizes in addition to narrower particle size distribution. By reducing the particle size of the suspension, a more homogeneous and uniform liquid fertilizer is generated thereby resulting in greater absorption by plants.

After the liquid fertilizer is passed through the nutrient mixing reactor system, independent lab analysis indicated that the surface tension of said fluid is reduced. This may increase the wettability and moisture retention capability of the fluid when applied to soil or any type of growing medium. By decreasing the surface tension of the fluid with ultrasonic treatment, liquid fertilizers remain in the growing medium for a longer period of time. Surfactants are typically used to achieve this phenomenon, whereas with ultrasonic treatment of liquid fertilizers, surfactants are not required to reduce the surface tension. This phenomenon may result in greater absorption by plants.

Additional independent laboratory analysis indicated that the amounts of solid particles suspended in the liquid is reduced. The results suggest that the ultrasonic nutrient mixing reactor is increasing the capacity of the liquid to dissolve higher amounts of multiple salts together reducing the salting out effect (i.e. increasing the co-solubility of individual salts in the solution of multiple salts). This is another product of the ultrasonic nutrient mixing reactor that should result in greater absorption by plants.

The present invention discloses a unique method of mixing plant nutrients comprising the steps of supplying at least one source of plant nutrients 90 to a high shear mixing device 100. A source of water 102 is provided for fluidly coupling to the high shear mixing device 100. The mixing device 100 is operated to bulk mix the plant nutrients and water at predetermined amounts to form an optimal mixture before introduction into the multi-frequency ultrasonic nutrient mixing system 10. At least one pump (not shown) is configured for pumping the mixture through the ultrasonic mixing reactor 10. The ultrasonic mixing reactor 10 is configured having at least one pump 20 fluidly coupled to the source of fluid bulk mixed plant nutrients.

The at least one pump 20 discharge is fluidly connected to a venture type nozzle device 22. The venturi nozzle is fluidly connected to a nozzle device 30 having at least one annular shaped plate 32 comprised of a plurality of apertures 34 constructed and arranged to create cavitation.

The venture nozzle device 22 discharge is fluidly coupled to a first ultrasonic reactor 40. The first ultrasonic reactor 40 is comprised of a container 42 having a plurality of variable frequency ultrasonic transducers 44, 45 mounted within said first ultrasonic reactor 40 for generating acoustic cavitation of said bulk mixed plant nutrients. The container 42 is constructed and arranged having a tube 46 centrally disposed within the container 42. The tube 46 is configured to create a directional vortex for discharge of the fluid from the first ultrasonic reactor 40. The container 42 is constructed and arranged having a plurality of plates 48, 50 mounted at a predetermined distance from the plurality of ultrasonic transducers 44, 45. This arrangement functions to deflect acoustic waves within the container 42 for enhanced mixing of the plant nutrients.

The first ultrasonic reactor discharge 52 is fluidly connected to a second ultrasonic reactor 60 comprised of a second container 70. The second container 70 is constructed and arranged having a plurality of variable frequency ultrasonic transducers 71, 73 mounted within said second ultrasonic reactor for generating acoustic cavitation of the bulk mixed plant nutrients. The second container 70 is constructed and arranged having a tube 74 centrally disposed within said second container 70. The tube 74 is constructed and arranged to create a directional vortex for discharge of the fluid from the second ultrasonic reactor. The container 70 is configured having a plurality of plates 76, 78 mounted at a predetermined distance from the plurality of ultrasonic transducers 71, 73. The plurality of plates 76, 78 are constructed and arranged to deflect acoustic waves within the container 70 for enhanced mixing of the plant nutrients.

The second ultrasonic reactor 60 discharge is fluidly coupled via piping 80 to plate static mixer 85 constructed and arranged to create hydrodynamic mixing. The conditioned plant nutrient mixture is discharged from the ultrasonic mixing reactor 60 to a vessel 108 constructed and arranged to cooperate with packaging equipment.

The ultrasonic mixing reactor 10 includes a recirculation circuit 112 for continuously recirculating the nutrient mixture until the desired properties are achieved. For example, the ultrasonic mixing reactor 10 may be recirculated until particles are reduced to less than 20 microns, thereby resulting in greater absorption by plants. The ultrasonic mixing reactor 10 may be recirculated until the surface tension of the liquid is reduced, thereby resulting in greater absorption by plants. The ultrasonic mixing reactor 10 may be recirculated until the amounts of solid particles suspended in the liquid is reduced, thereby resulting in greater absorption by plants.

In another embodiment, the source of plant nutrients includes four salts. For example, one salt is comprised of potassium nitrate, one salt is comprised of calcium nitrate, one salt is comprised of urea and one salt is comprised of magnesium nitrate.

In one embodiment, the source of water is conditioned through a reverse osmosis system. However, any clean water source would be suitable in the present disclosed application.

In one non-limiting example, 500 gallons of nutrient can be mixed by supplying 3025 lbs of water in a container 102 treated with a reverse osmosis process is to the shear mixing reactor 100. 302 lbs of potassium nitrate (Salt A), 680 lbs of calcium nitrate (Salt B), 90 lbs of urea (Salt C) and 303 lbs of magnesium nitrate (Salt D) are added to the shear mixing reactor 100 with constant stirring. The shear mixer 100 is continuously run to achieve bulk mixing of the added solid constituents without settling them to the bottom of the reactor. The mixture is then passed through two ultrasonic reactors 40, 60 in a recirculation mode for 30 minutes at 50 gpm. Each ultrasonic reactor assembly has multiple transducers operating at different frequencies which pass ultrasonic waves into the mixture and cause cavitation in the suspension slurry. The adjustable power is kept at 12,000 watts in the two ultrasonic reactors. In this example, the frequencies are kept at 16 kHz in the first ultrasonic reactor and 20 kHz in the second reactor. However, any combination of frequencies can be used on either of the ultrasonic reactors. The power is also adjustable on these reactors and can be varied to achieve optimum cavitation which depends upon the flow rate, % solids, power, frequency, residence time, number of passes, temperature, pressure and the nature of the salts. After recirculating through the reactor, the nutrients are micro mixed due to the microstreaming, cavitation, shockwaves, and jet formation from ultrasonic waves. Initial labs tests indicate a reduction of the particle size from initial 200 micron particles to less than 20 microns. The ultrasonic waves also reduce the surface tension of the liquid from 53.61 mN/m to 47.93 mN/m after recirculation through the ultrasonic reactor. The number of solid particles suspended (TSS) in the liquid reduces from 21,154 mgTSS/L to approximately 11,611 mgTSS/L. These observed results seem to indicate that liquid fertilizers remain in the growing medium for a longer period of time. This may increase the wettability and moisture retention capability of the fluid when applied to soil or any type of growing medium.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An ultrasonic mixing reactor system for mixing plant nutrients comprising:
    at least one pump fluidly coupled to a source of fluid bulk mixed plant nutrients,
    said at least one pump discharge fluidly connected to a venturi nozzle device,
    said venturi nozzle fluidly connected to a nozzle device having at least one annular shaped plate comprised of a plurality of apertures constructed and arranged to create cavitation,
    said nozzle device discharge fluidly coupled to a first ultrasonic reactor, said first ultrasonic reactor comprised of a first container having a plurality of variable frequency ultrasonic transducers mounted within said first ultrasonic reactor for generating acoustic cavitation of said bulk mixed plant nutrients, said first container having a tube centrally disposed within said first container, said tube constructed and arranged to create a directional vortex for discharge of said fluid from said first ultrasonic reactor, said container having a plurality of plates mounted at a predetermined distance from said plurality of ultrasonic transducers constructed and arranged to deflect acoustic waves within said container,
    said first ultrasonic reactor discharge fluidly connected to a second ultrasonic reactor comprised of a second container having a plurality of variable frequency ultrasonic transducers mounted within said second ultrasonic reactor for generating acoustic cavitation of said bulk mixed plant nutrients, said second container having a tube centrally disposed within said second container, said tube constructed and arranged to create a directional vortex for discharge of said fluid from said second ultrasonic reactor, said container having a plurality of plates mounted at a predetermined distance from said plurality of ultrasonic transducers constructed and arranged to deflect acoustic waves within said container,
    said second ultrasonic reactor discharge fluidly coupled to plate static mixer constructed and arranged to create hydrodynamic mixing.

2. The ultrasonic mixing reactor system for mixing plant nutrients according to claim 1, wherein said first and said second ultrasonic reactors are cylindrical.

3. The ultrasonic mixing reactor system for mixing plant nutrients according to claim 1, wherein said plurality of ultrasonic transducers mounted within said first ultrasonic reactor operate at 16 kHz.

4. The ultrasonic mixing reactor system for mixing plant nutrients according to claim 1, wherein said plurality of ultrasonic transducers mounted within said second ultrasonic reactor operate at 20 kHz.

5. The ultrasonic mixing reactor system for mixing plant nutrients according to claim 1, wherein said plant nutrient particles size is reduced to less than 20 microns thereby resulting in greater absorption by plants.

6. The ultrasonic mixing reactor system for mixing plant nutrients according to claim 1, wherein surface tension of said fluid is reduced thereby resulting in greater absorption by plants.

7. The ultrasonic mixing reactor system for mixing plant nutrients according to claim 1, wherein the number of solid particles suspended in said liquid is reduced thereby resulting in greater absorption by plants.

8. The ultrasonic mixing reactor system for mixing plant nutrients according to claim 1, wherein said tube centrally disposed in said first container having at least one electrode, electrically connected to a power source, positioned within said tube in contact with said fluid.

9. The ultrasonic mixing reactor system for mixing plant nutrients according to claim 1, wherein said tube centrally disposed in said second container having at least one electrode, electrically connected to a power source, positioned within said tube in contact with said fluid.

10. A method of mixing plant nutrients comprising the steps of:
    supplying at least one source of plant nutrients to a high shear mixing device,
    fluidly connecting a source of water to said high shear mixing device,
    operating said mixing device to bulk mix said plant nutrients and water at predetermined amounts to form a mixture,
    pumping said mixture through an ultrasonic mixing reactor,
    said ultrasonic mixing reactor having at least one pump fluidly coupled to a source of fluid bulk mixed plant nutrients,
    said at least one pump discharge fluidly connected to a venturi nozzle device,
    said venturi nozzle fluidly connected to a nozzle device having at least one annular shaped plate comprised of a plurality of apertures constructed and arranged to create cavitation, said nozzle device discharge fluidly coupled to a first ultrasonic reactor, said first ultrasonic reactor comprised of a container having a plurality of variable frequency ultrasonic transducers mounted within said first ultrasonic reactor for generating acoustic cavitation of said bulk mixed plant nutrients, said container having a tube centrally disposed within said container, said tube constructed and arranged to create a directional vortex for discharge of said fluid from said first ultrasonic reactor, said container having a plurality of plates mounted at a predetermined distance from said plurality of ultrasonic transducers constructed and arranged to deflect acoustic waves within said container, said first ultrasonic reactor discharge fluidly connected to a second ultrasonic reactor comprised of a second container having a plurality of variable frequency ultrasonic transducers mounted within said second ultrasonic reactor for generating acoustic cavitation of said bulk mixed plant nutrients, said second container having a tube centrally disposed within said second container, said tube constructed and arranged to create a directional vortex for discharge of said fluid from said second ultrasonic reactor, said container having a plurality of plates mounted at a predetermined distance from said plurality of ultrasonic transducers constructed and arranged to deflect acoustic waves within said container, said second ultrasonic reactor discharge fluidly coupled to plate static mixer constructed and arranged to create hydrodynamic mixing, pumping said plant nutrient mixture from said ultrasonic mixing reactor to a vessel constructed and arranged to cooperate with packaging equipment.

11. The method of mixing plant nutrients according to claim 10, wherein said ultrasonic mixing reactor includes a recirculation circuit.

12. The method of mixing plant nutrients according to claim 10, wherein said ultrasonic mixing reactor is recirculated until particles are reduced to less than 20 microns, thereby resulting in greater absorption by plants.

13. The method of mixing plant nutrients according to claim 10, wherein said ultrasonic mixing reactor is recirculated until the surface tension of the liquid is reduced, thereby resulting in greater absorption by plants.

14. The method of mixing plant nutrients according to claim 10, wherein said ultrasonic mixing reactor is recirculated until the amounts of solid particles suspended in the liquid is reduced, thereby resulting in greater absorption by plants.

15. The method of mixing plant nutrients according to claim 10, wherein said source of plant nutrients includes four salts.

16. The method of mixing plant nutrients according to claim 15, wherein one salt is comprised of potassium nitrate.

17. The method of mixing plant nutrients according to claim 15, wherein one salt is comprised of calcium nitrate.

18. The method of mixing plant nutrients according to claim 15, wherein one salt is comprised of urea.

19. The method of mixing plant nutrients according to claim 15, wherein one salt is comprised of magnesium nitrate.

20. The method of mixing plant nutrients according to claim 10, wherein said source of water is conditioned through a reverse osmosis system.

* * * * *